US011692899B2

(12) United States Patent
Burke et al.

(10) Patent No.: US 11,692,899 B2
(45) Date of Patent: Jul. 4, 2023

(54) SYSTEM AND METHOD FOR MONITORING AND RESPONDING TO SENSED ENVIRONMENTAL EVENTS AND SENSORS THEREFOR

(71) Applicant: AABiX Corporation, Ithaca, NY (US)

(72) Inventors: Scott Lincoln Burke, Ithaca, NY (US); William Ruben Salcedo, Point Pleasant, NJ (US); Patrick Bem, Pittsburgh, PA (US)

(73) Assignee: AABIX CORPORATION, Ithaca, NY (US)

( * ) Notice: Subject to any disclaimer, the term of this patent is extended or adjusted under 35 U.S.C. 154(b) by 0 days.

(21) Appl. No.: 17/692,939

(22) Filed: Mar. 11, 2022

(65) Prior Publication Data

US 2022/0291070 A1   Sep. 15, 2022

Related U.S. Application Data

(60) Provisional application No. 63/159,940, filed on Mar. 11, 2021.

(51) Int. Cl.
  *G01M 3/04* (2006.01)
  *G08B 21/20* (2006.01)
  (Continued)

(52) U.S. Cl.
  CPC .......... *G01M 3/045* (2013.01); *G06Q 10/20* (2013.01); *G08B 7/06* (2013.01); *G08B 17/117* (2013.01);
  (Continued)

(58) Field of Classification Search
  CPC ....... G01M 3/045; G08B 7/06; G08B 17/117; G08B 21/16; G08B 21/20; G08B 25/10
  See application file for complete search history.

(56) References Cited

U.S. PATENT DOCUMENTS 5,463,377 A * 10/1995 Kronberg ............... G08B 21/20
  340/592
9,582,981 B2 * 2/2017 Rokhsaz ............... H01Q 9/0442
  (Continued)

FOREIGN PATENT DOCUMENTS

JP        2017067609 A  *  4/2017

OTHER PUBLICATIONS

Lee et al., "New leak detection technique using ceramic humidity sensor for water reactors" Nuclear engineering and design, Mar. 2001, pp. 23-33.
(Continued)

*Primary Examiner* — John A Tweel, Jr.
(74) *Attorney, Agent, or Firm* — Leason Ellis LLP

(57) ABSTRACT

A wireless sensing device for environmental monitoring of a location is provided. The sensing device includes an electronic system and a housing for securing and protecting the electronic system in a cavity therein. The housing includes a vented top portion defining the cavity, and a wicking base portion including wicking material attached to and covering an exposed underside of the top portion. The electronic system includes: a temperature and humidity sensor for sensing a current temperature and humidity of the location and converting the sensed temperature and humidity to temperature and humidity signals; a wireless transmitter for periodically wirelessly transmitting the temperature and humidity signals from the location to an external computing device; an alerting device for providing an audible, visual, or tactile signal from the location in order to alert a user of a condition of interest; and a microcontroller for controlling the electronic system devices.

19 Claims, 9 Drawing Sheets

(51) Int. Cl.
  *G08B 21/16*  (2006.01)
  *G08B 25/10*  (2006.01)
  *G06Q 10/20*  (2023.01)
  *G08B 17/117* (2006.01)
  *G08B 7/06*   (2006.01)
  *H04W 4/38*   (2018.01)

(52) U.S. Cl.
  CPC .............. *G08B 21/16* (2013.01); *G08B 21/20* (2013.01); *G08B 25/10* (2013.01); *H04W 4/38* (2018.02)

(56) References Cited

U.S. PATENT DOCUMENTS

| | | | |
|---|---|---|---|
| 10,121,353 B1* | 11/2018 | Billman | G01M 3/40 |
| 10,284,926 B2* | 5/2019 | Bambrick | H04Q 9/00 |
| 10,672,252 B2* | 6/2020 | Sale | G08B 21/182 |
| 11,313,751 B1* | 4/2022 | McGehee | G01M 3/16 |
| 2019/0060137 A1* | 2/2019 | Severns | A61F 13/15203 |
| 2023/0003605 A1* | 1/2023 | Rasmussen | G08B 21/20 |

OTHER PUBLICATIONS

Ce Hagentoft et al., "Controlled Ventilation of Cold Attics Moisture Safety Aspects", pp. 1-11.

\* cited by examiner

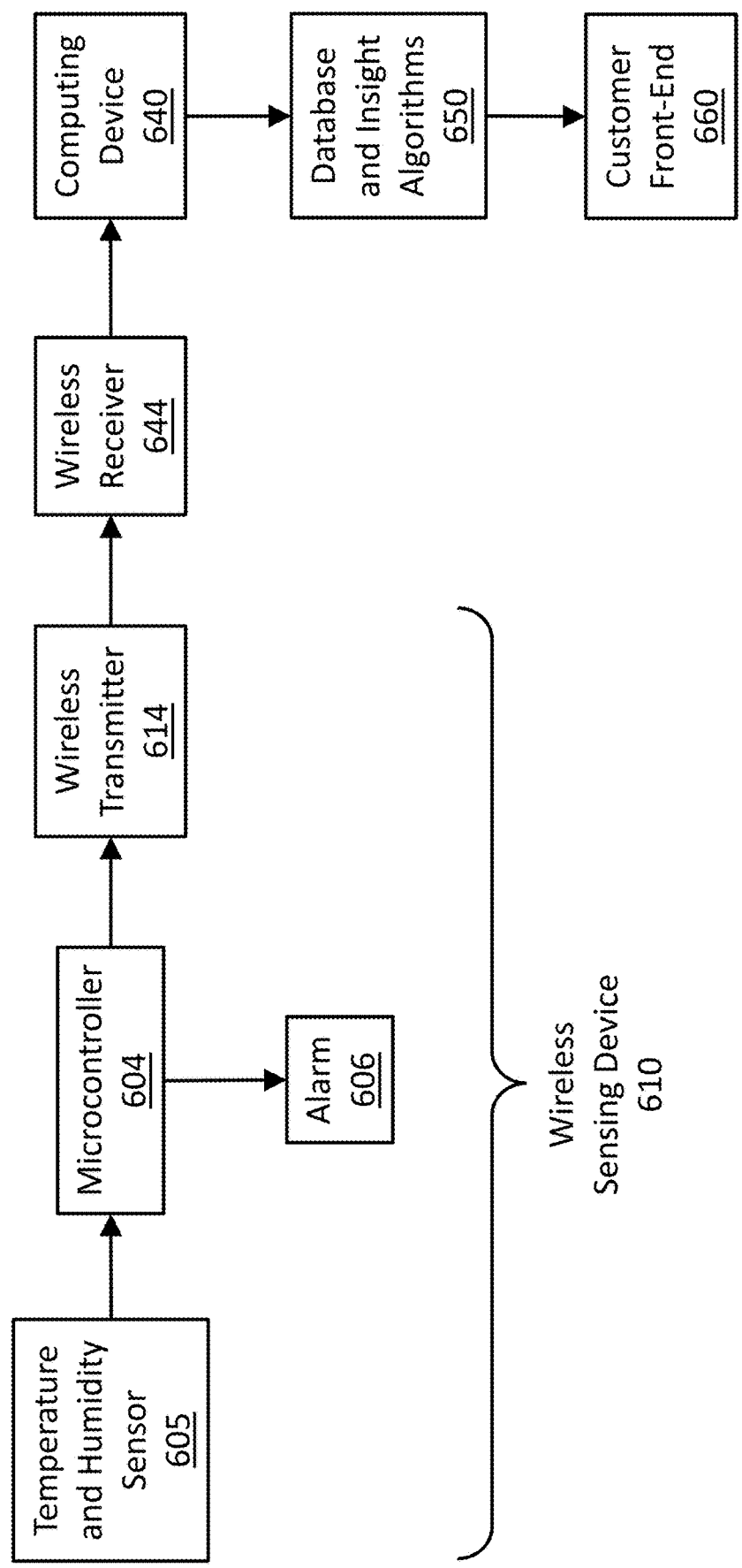

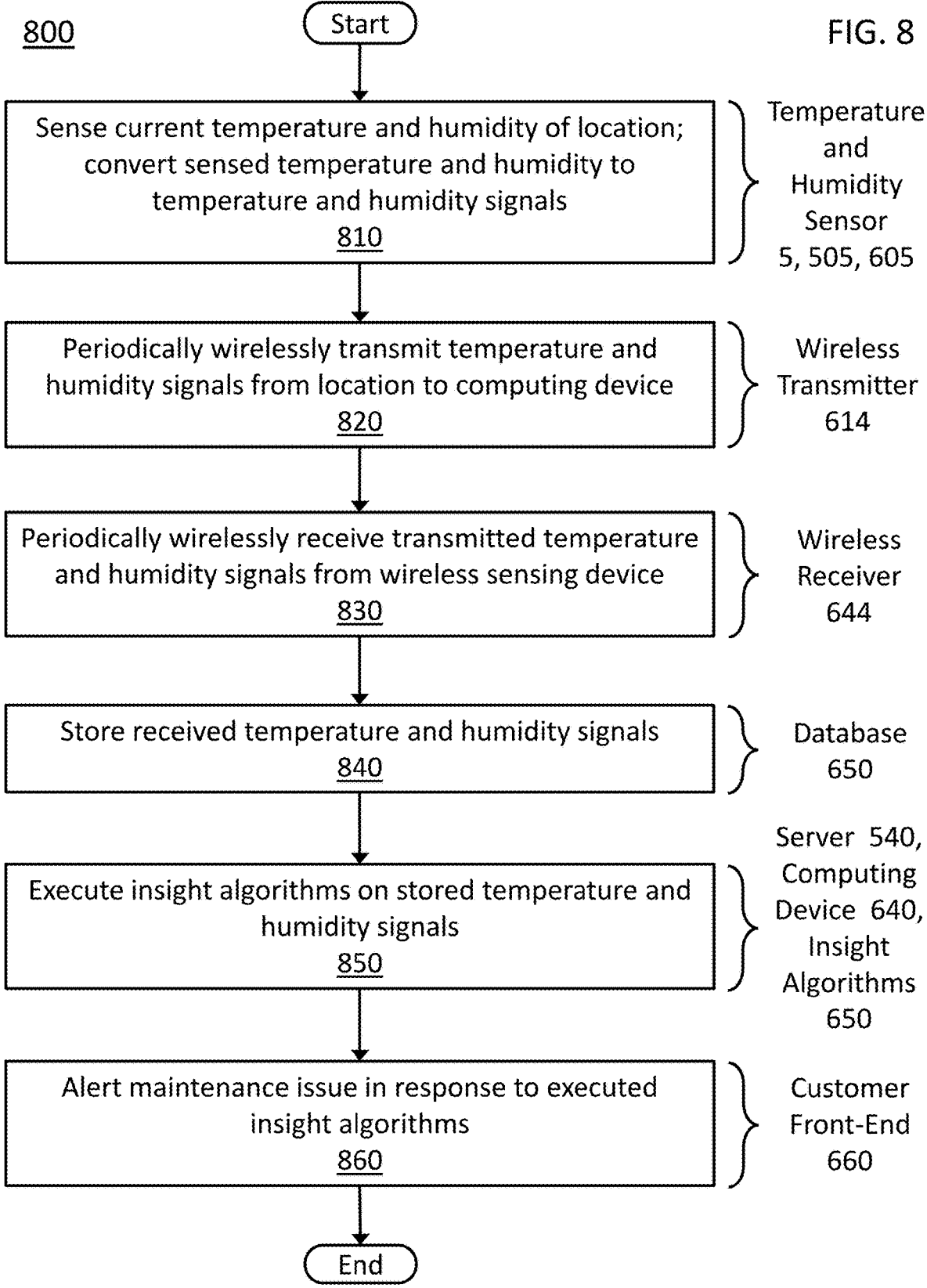

SYSTEM AND METHOD FOR MONITORING AND RESPONDING TO SENSED ENVIRONMENTAL EVENTS AND SENSORS THEREFOR

CROSS-REFERENCE TO RELATED APPLICATION

The present application claims the benefit of U.S. Provisional Appl. No. 63/159,940, filed Mar. 11, 2021, entitled "INTERNET CONNECTED HOME ENVIRONMENT INFORMATION DEVICE," which is incorporated herein by reference in its entirety.

FIELD OF THE DISCLOSURE

The present disclosure relates in general to automated environmental monitoring, and more specifically to a system and method for monitoring and responding to sensed environmental events, and sensors for sensing the environmental events.

BACKGROUND OF THE DISCLOSURE

Addressing environmental and maintenance issues, such as temperature regulation and plumbing integrity, is an important part of property management. Often, such issues go unnoticed and creep up over time. Still other such issues may suddenly appear (e.g., a burst pipe), with time being of the essence to detect them and address them.

It is in regard to these and other problems in the art that the present disclosure is directed to provide a technical solution for effective wireless sensing devices for environmental monitoring, and for effective environmental monitoring systems using the wireless sensing devices.

SUMMARY OF THE DISCLOSURE

According to a first aspect of the disclosure, a wireless sensing device for environmental monitoring of a location is provided. The wireless sensing device includes an electronic system and a housing for securing and protecting the electronic system in a cavity therein. The housing includes a vented top portion defining the cavity, and a wicking base portion including wicking material attached to and covering an exposed underside of the top portion. The electronic system comprises: a temperature and humidity sensor for sensing a current temperature and humidity of the location and converting the sensed temperature and humidity to temperature and humidity signals; a wireless transmitter for periodically wirelessly transmitting the temperature and humidity signals from the location to an external computing device; an alerting device for providing an audible, visual, or tactile signal from the location in order to alert a user of a condition of interest; and a microcontroller for controlling the temperature and humidity sensor, the wireless transmitter, and the alerting device.

In an embodiment consistent with the above, the top portion comprises venting holes to increase thermal conductivity between the cavity and outside of the housing while allowing the housing to still protect the electronic system.

In an embodiment consistent with the above, the wicking material is configured to absorb water from under the housing and evaporate the absorbed water into the cavity through the exposed underside of the top portion.

In an embodiment consistent with the above, the electronic system further comprises a printed circuit board (PCB) for securing and interconnecting the temperature and humidity sensor, the wireless transmitter, the alerting device, and the microcontroller.

In an embodiment consistent with the above, the housing comprises a plurality of feet for receiving anchoring devices to anchor the housing to the location.

In an embodiment consistent with the above, the wireless sensing device further comprises a volatile organic compound sensor, wherein the condition of interest is a flammable gas leak, and the microcontroller is configured to control the volatile organic compound sensor and to activate the alerting device in response to the volatile organic compound sensor detecting the flammable gas.

In an embodiment consistent with the above, the wireless sensing device further comprises porous adhesive attaching the wicking material to the underside of the top portion and configured to allow water below the top portion to reach and be absorbed by the wicking material.

In an embodiment consistent with the above, the top portion defines a storage area for securing and protecting one or more batteries for powering the electronic system.

In an embodiment consistent with the above, the wireless sensing device further comprises a voltage sensor for sensing a current voltage of the batteries and converting the sensed voltage to a voltage signal, wherein the wireless transmitter is further for periodically wirelessly transmitting the voltage signal from the location to the external computing device.

In an embodiment consistent with the above, the wireless transmitter comprises a Wi-Fi router for establishing and communicating through a Wi-Fi connection with the external computing device.

According to another aspect of the disclosure, an environmental monitoring system for use with a computing device having a wireless receiver, a non-transitory storage device, and a display device is provided. The monitoring system comprises a wireless sensing device for environmental monitoring of a location. The wireless sensing device comprises an electronic system and a housing for securing and protecting the electronic system in a cavity therein. The housing comprises a vented top portion defining the cavity and a wicking base portion comprising wicking material attached to and covering an exposed underside of the top portion, The electronic system comprises: a temperature and humidity sensor for sensing a current temperature and humidity of the location and converting the sensed temperature and humidity to temperature and humidity signals; and a wireless transmitter for periodically wirelessly transmitting the temperature and humidity signals from the location to the computing device. The monitoring system further comprises a non-transitory computer readable medium (CRM) having computer instructions stored therein that, when executed by the computing device, cause the computing device to carry out an environmental monitoring process. The monitoring process comprises periodically wirelessly receiving the transmitted temperature and humidity signals from the wireless sensing device using the wireless receiver, storing the received temperature and humidity signals in the non-transitory storage device, executing insight algorithms on the stored temperature and humidity signals, and alerting a maintenance issue on the display device in response to the executed insight algorithms.

In an embodiment consistent with the monitoring system described above, the insight algorithms comprise leak detection, interior freezing potential, and mold growth conditions.

In an embodiment consistent with the monitoring system described above, the wicking material is configured to absorb water from under the housing and evaporate the absorbed water into the cavity through the exposed underside of the top portion, and the insight algorithms are configured to detect a leak at the location in response to a sudden increase in the sensed humidity from the evaporation.

In an embodiment consistent with the monitoring system described above, the wireless sensing device comprises a plurality of wireless sensing devices for monitoring a respective plurality of different locations, and the monitoring process further comprises repeating each of the steps on corresponding received temperature and humidity signals from each wireless sensing device.

In an embodiment consistent with the monitoring system described above, the monitoring process further comprises displaying a dashboard on the display device that allows users to track different issues that the wireless sensing devices detect.

According to another aspect of the disclosure, an automated method of environmental monitoring of a location using a wireless sensing device at the location is provided. The method comprises: sensing, using a temperature and humidity sensor of the wireless sensing device, a current temperature and humidity of the location; converting, using the temperature and humidity sensor, the sensed temperature and humidity to temperature and humidity signals; periodically wirelessly transmitting, using a wireless transmitter of the wireless sensing device, the temperature and humidity signals from the location to a computing device; periodically wirelessly receiving, using a wireless receiver of the computing device, the transmitted temperature and humidity signals from the wireless sensing device; storing, in a non-transitory storage device of the computing device, the received temperature and humidity signals; executing, using the computing device, insight algorithms on the stored temperature and humidity signals; and alerting, on a display device of the computing device, a maintenance issue in response to the executed insight algorithms. The wireless sensing device comprises a housing for securing and protecting the temperature and humidity sensor and the wireless transmitter in a cavity therein. The housing comprises a vented top portion defining the cavity, and a wicking base portion comprising wicking material attached to and covering an exposed underside of the top portion.

In an embodiment consistent with the method described above, the insight algorithms comprise leak detection, interior freezing potential, and mold growth conditions.

In an embodiment consistent with the method described above, the method further comprises: absorbing, using the wicking material, water from under the housing; evaporating, using the wicking material, the absorbed water into the cavity through the exposed underside of the top portion; and detecting, using the insight algorithms on the computing system, a leak at the location in response to a sudden increase in the sensed humidity from the evaporation.

In an embodiment consistent with the method described above, the wireless sensing device comprises a plurality of wireless sensing devices for monitoring a respective plurality of different locations, and the method further comprises repeating each of the steps on each wireless sensing device and corresponding received temperature and humidity signals from the wireless sensing device.

In an embodiment consistent with the method described above, the method further comprises displaying, on the display device, a dashboard that allows users to track different issues that the wireless sensing devices detect.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 6 is a block diagram of an example environmental monitoring system, according to another embodiment.

FIG. 8 is a flow diagram of an example automated method for environmental monitoring of a location using a wireless sensing device at the location, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1:
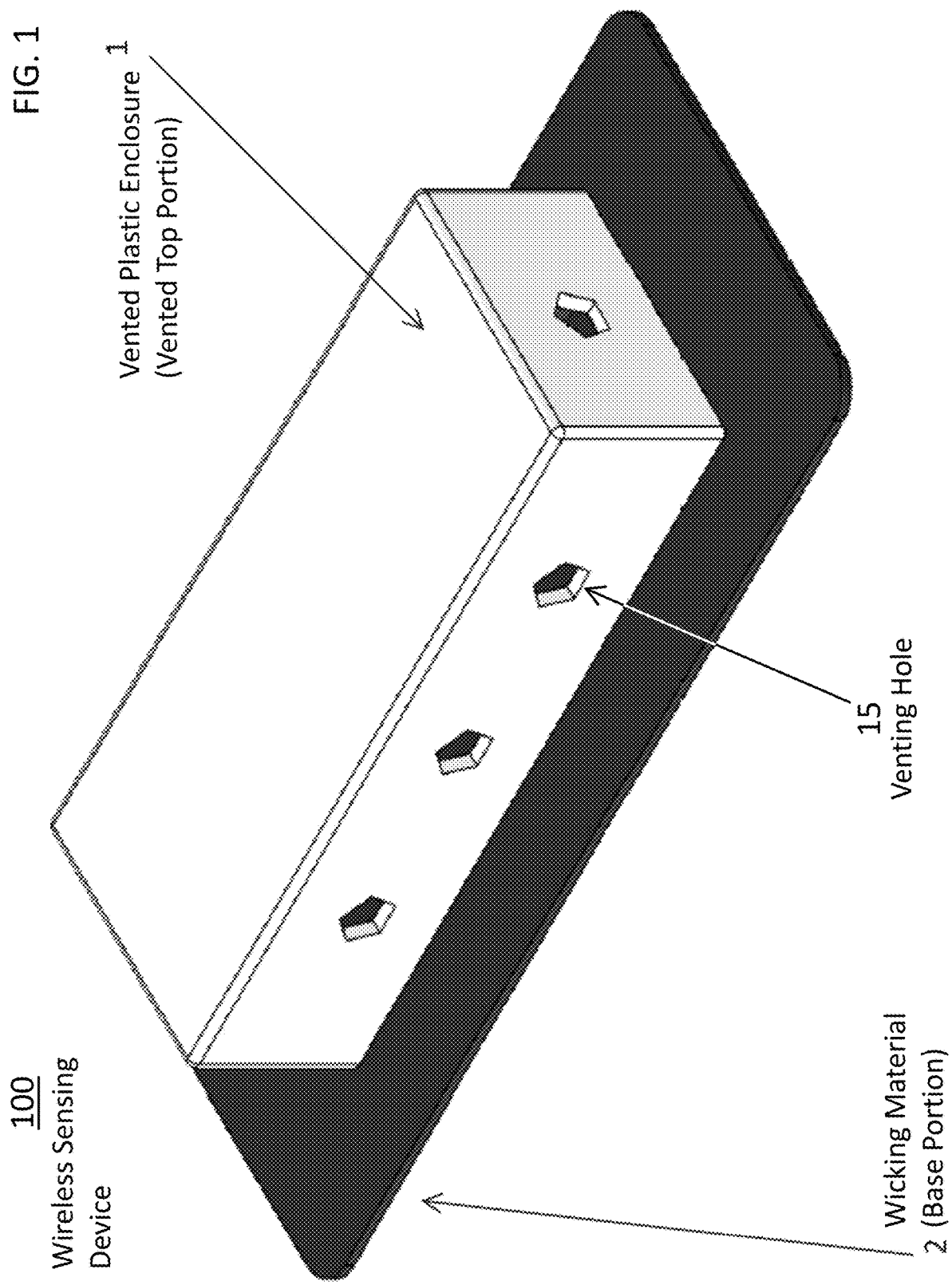
FIG. 1 is an isometric top view of an example wireless sensing device for environmental monitoring of a location, according to an embodiment.

Example embodiments of the present disclosure are directed to environmental monitoring techniques. In some embodiments, an environmental sensing device includes a combination of moisture wicking material and a humidity sensor together with an enclosure and other environmental sensors (such as a temperature sensor) to detect environmental or maintenance issues such as leaks and other home environment conditions. Moisture wicking material used in conjunction with a humidity sensor allows the sensing device to detect household leaks by absorbing water and evaporating it into the device enclosure. The humidity sensor detects the increased relative humidity within the device enclosure, allowing it to detect water leakage without electrode sensors. In an example embodiment, an Internet connected data-collection device with a moisture-wicking material affixed to the bottom of its enclosure enables the data collection device to detect the presence of water. The data collection device detects faults in home HVAC and plumbing systems without being installed directly on the systems.

Alternative approaches for leak detection, such as using two electrodes spaced apart, are not as reliable. For such sensors to work, both electrodes must be immersed in the same pool of water. Otherwise, current will not conduct from one electrode to the other, and the sensor will not detect the leak.

It is in regard to this and other problems and challenges that embodiments of the present disclosure are directed to an effective Internet connected home environment information device. In some such embodiments, a wireless sensing device for environmental monitoring of a location is provided. The sensing device includes a flat bottom having moisture wicking material together with an internal cavity having a humidity sensor. The sensing device detects the water (or leak) through measuring a rapid increase in humidity in the cavity resulting from evaporated water that is absorbed through the moisture wicking material. The sensing device has a wireless Internet connection. The sensing device, in connection with a remote computing device for data storing and analysis, performs environmental data collection and detection of faults in home heating, ventilation, and air conditioning (HVAC) as well as plumbing systems. Internet connected devices are electronic devices connected to other networks or devices using wireless protocols including Wi-Fi, Bluetooth, Zigbee, and 5G, to name a few, through which they can access the Internet.

In some such embodiments, a wireless sensing device includes an enclosure with three vented plastic faces (sides), two unvented plastic faces (side and top), and moisture-wicking material affixed to the remaining face (bottom) of the enclosure. The unvented side plastic face contains a door for accessing a battery storage chamber that holds one or more batteries. In some such embodiments, the moisture-wicking material covers an entire bottom portion (base) of the sensing device. This allows the sensing device to absorb water from any part of its peripheral area, in addition to the central portion. In some such embodiments, this functionality allows for a low-cost data collection device that wirelessly sends home environmental data such as relative humidity, temperature, and water presence. By way of example, with just a temperature and humidity sensor and moisture-wicking material, many HVAC and plumbing faults such as pipe freeze, leaking pipes, mold growth potential, insulation inefficiencies, and energy inefficiencies can be detected.

In example embodiments, a wireless sensing device includes a temperature and humidity sensor, moisture wicking material on a bottom of the sensing device, a volatile organic compound sensor, a piezoelectric alarm buzzer, a microcontroller programmed to control the electronics, and a plurality of batteries powering the electronics. The volatile organic compound sensor detects the presence of natural gas and other latent flammable compounds. The combination of volatile organic compound sensor and alarm allows bystanders to be alerted of the presence of flammable gasses in their home. The alarm can also alert other environmental issues. The sensing device is wirelessly connected to an external computing device that stores acceptable high limit values of volatile organic compound readings. In one embodiment, the microcontroller is further programmed to alert local emergency responders, or the homeowner, or a maintenance person when potentially dangerous or costly environmental conditions are reached (e.g., natural gas leak, temperature outside of safe range, water leak, humidity too high, to name a few). In an embodiment, an environmental sensing system includes a wireless sensing device with a temperature and humidity sensor, moisture wicking material, and one or more supplementary home or building environment sensors including, but not limited to, an atmospheric pressure sensor, a motion sensor, a gyroscope, a hall-effect sensor, a carbon monoxide sensor, an air quality sensor, and a microphone (e.g., to detect broken glass, rodents, and the like).

According to some embodiments, the wireless sensing device (or sensor) is installed in a convenient location of the home, such as within a kitchen cabinet beneath a sink, a basement (including an unfinished basement), a hot water heater, and an air handling unit condensate pan, to name a few. It operates by moisture wicking material in conjunction with a humidity sensor that allows the sensing device to detect leaks in the vicinity. It additionally has a temperature sensor that detects home heating efficiency and cooling efficiency. In some such embodiments, the sensing device includes volatile organic compound sensors for detecting the presence of natural gas, and other hazardous airborne compounds. Other sensors may be included in the sensing device to detect other data.

In some embodiments, the home environment information device (or sensing device) is programmed or otherwise configured to wirelessly transmit or send a signal to an external computing device, such as a database server. The computing device or server contains an application that is programmed to implement an algorithm that detects home HVAC and plumbing faults. The application is configured (e.g., by code, programming, or logic) to notify the homeowner about potential HVAC and plumbing faults through the data sent by the home environment information device.

In some embodiments, the sensing device includes a microcontroller (or other programmable logic device) to detect HVAC and plumbing faults and transmit telemetry to a remote server or computing device. The sensing device can be placed anywhere in a home or building being monitored, such as under a kitchen sink. In particular, the sensing does not need to be installed directly into a home HVAC or plumbing system. As such, the sensing device may be retrofitted for use with any HVAC and plumbing system and still operate properly. The sensing device detects the presence of water (such as leaks) by using a combination of moisture wicking material and a humidity sensor.

In some embodiments, a wireless sensing device includes an enclosure with wicking material affixed to the bottom and venting holes along the sides. This allows environmental temperature and humidity sensors enclosed therein (e.g., on a printed circuit board or PCB) to monitor ambient temperature and detect latent water below the enclosure. In some such embodiments, additional sensors are affixed to the circuit board for further data collection. Such sensors can include volatile organic compound sensors, pressure sensors, motion sensors, oxygen sensors, carbon monoxide sensors, or air pollution sensors. These and other embodiments will now be described with reference to FIGS. 1-8.

Figure 2:
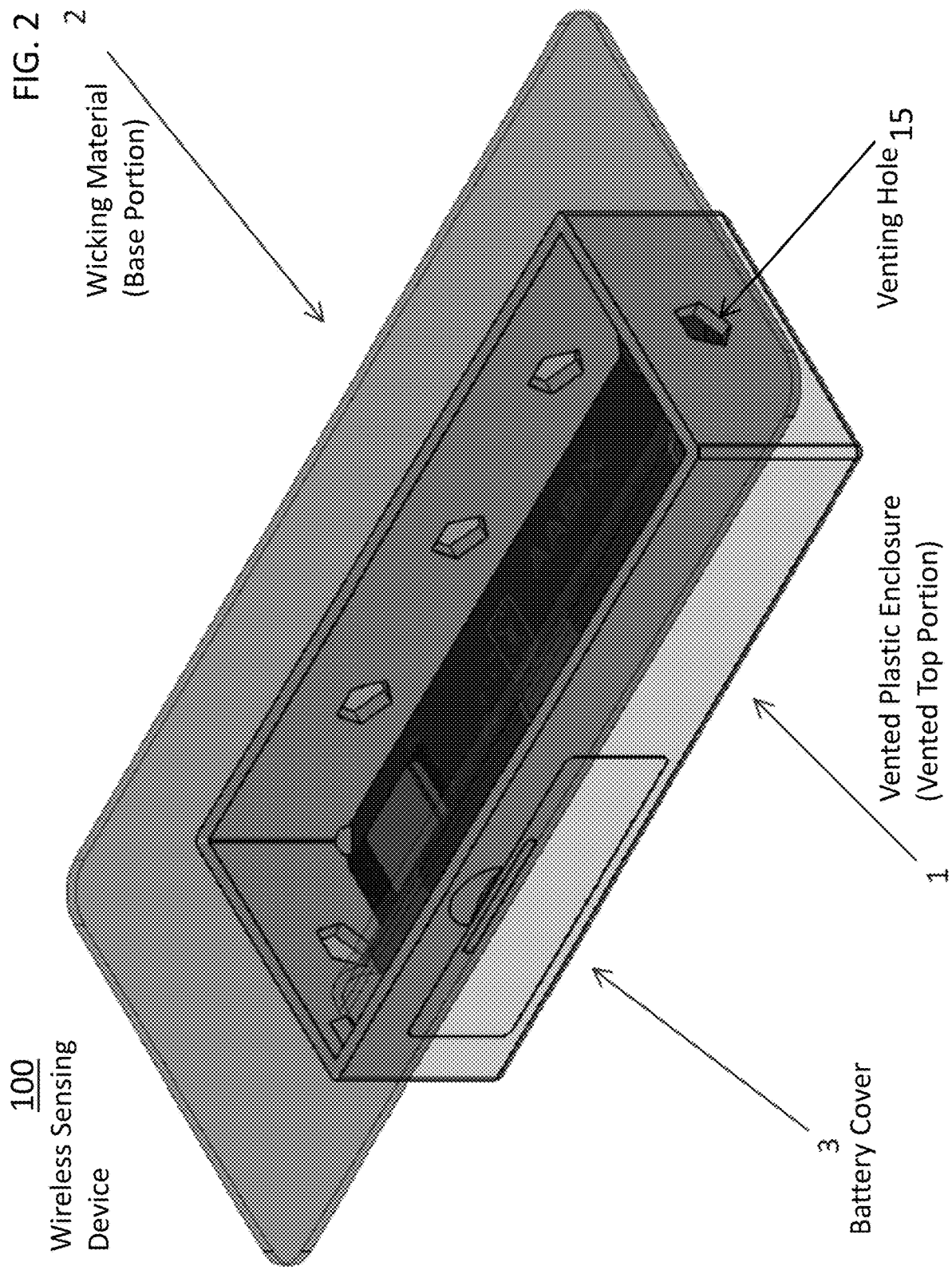
FIG. 2 is an isometric bottom view of the wireless sensing device of FIG. 1, with the moisture-wicking material illustrated as transparent.
Figure 3:
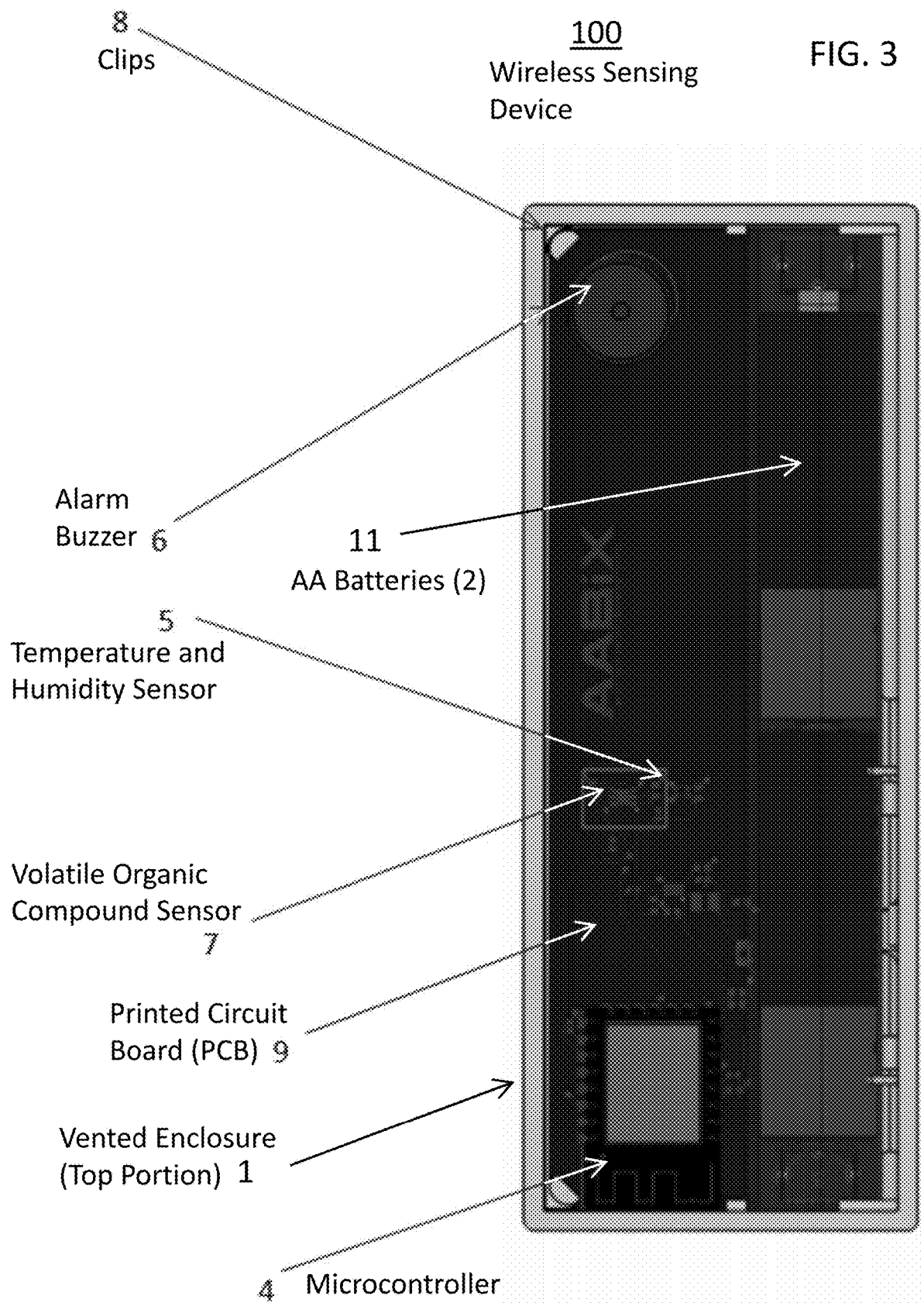
FIG. 3 is a bottom cutaway view of the interior of the wireless sensing device of FIGS. 1-2.

FIG. 1 is an isometric top view of an example wireless sensing device 100 for environmental monitoring of a location, according to an embodiment. FIG. 2 is an isometric bottom view of the wireless sensing device 100 of FIG. 1, with the moisture-wicking material illustrated as transparent. FIG. 3 is a bottom cutaway view of the interior of the wireless sensing device 100 of FIGS. 1-2.

Referring to FIGS. 1-3, a moisture wicking material 2 is affixed to an open bottom of a plastic vented enclosure 1. A battery door clip 3 snaps onto plastic vented enclosure 1 and allows access to one or more batteries 11 (such as two AA batteries 11) inside the enclosure 1. The enclosure 1 has five venting holes 15 (three on one side, one on each of two end sides) along with an exposed bottom. The plastic vented enclosure 1 has clips 8 molded onto it to allow for printed circuit board (PCB) 9 to be affixed to the plastic vented enclosure 1. Moisture wicking material 2 used in conjunction with plastic enclosure 1 and humidity sensor 5 allows for the wireless sensing device 100 to detect latent water. In addition, the sensing device 100 includes an Internet-connected microcontroller 4 (e.g., having a wireless transmitter, transceiver, or router with access to the Internet), a temperature and humidity sensor 5, an alarm buzzer 6, and a volatile organic compound sensor 7. PCB 9 additionally contains all of the supporting components required for operation of the electronic devices.

The alarm buzzer 6 is used to alert users to a condition of interest. For example, the microcontroller 4 can be programmed to activate the alarm buzzer 6 when a volatile organic compound is detected (e.g., by the volatile organic compound sensor 7). Depending on the implementation, the alarm buzzer 6 can generate one or more of an audible alert (e.g., alarm or other sound), a tactile alert (e.g., vibration), or a visible alert (e.g., light). Thus, the alarm buzzer 6 can be implemented as an alarm, a buzzer, a speaker, an electroacoustic transducer, or a light emitting diode (LED), to name a few. The condition of interest can be an environmental issue, or a microcontroller notification, such as "searching for Wi-Fi" or "device setup successful."

Figure 4:
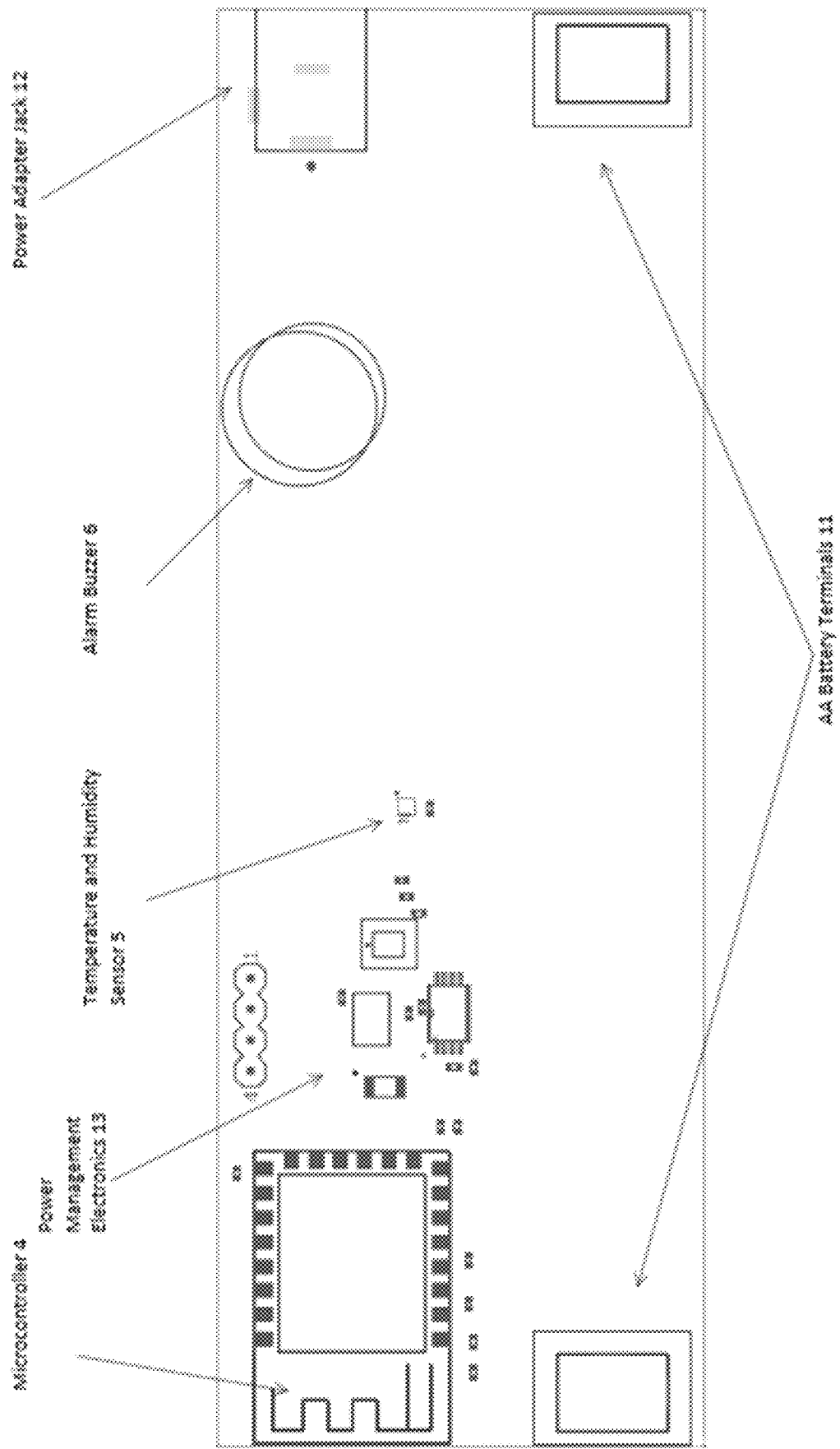
FIG. 4 is a layout view of an example printed circuit board (PCB) of a wireless sensing device, according to an embodiment.

FIG. 4 is a layout view of an example printed circuit board (PCB) 400 of a wireless sensing device, according to an embodiment. The PCB 400 includes a microcontroller 4, a temperature and humidity sensor 5, an alarm buzzer 6, AA battery terminals 11 (for two AA batteries), a power adapter jack 12, and power management electronics 13. The PCB 400 can be secured, for example, to the inside top of the vented plastic enclosure 1 of wireless sensing device 100 using clips 8.

Figure 5:
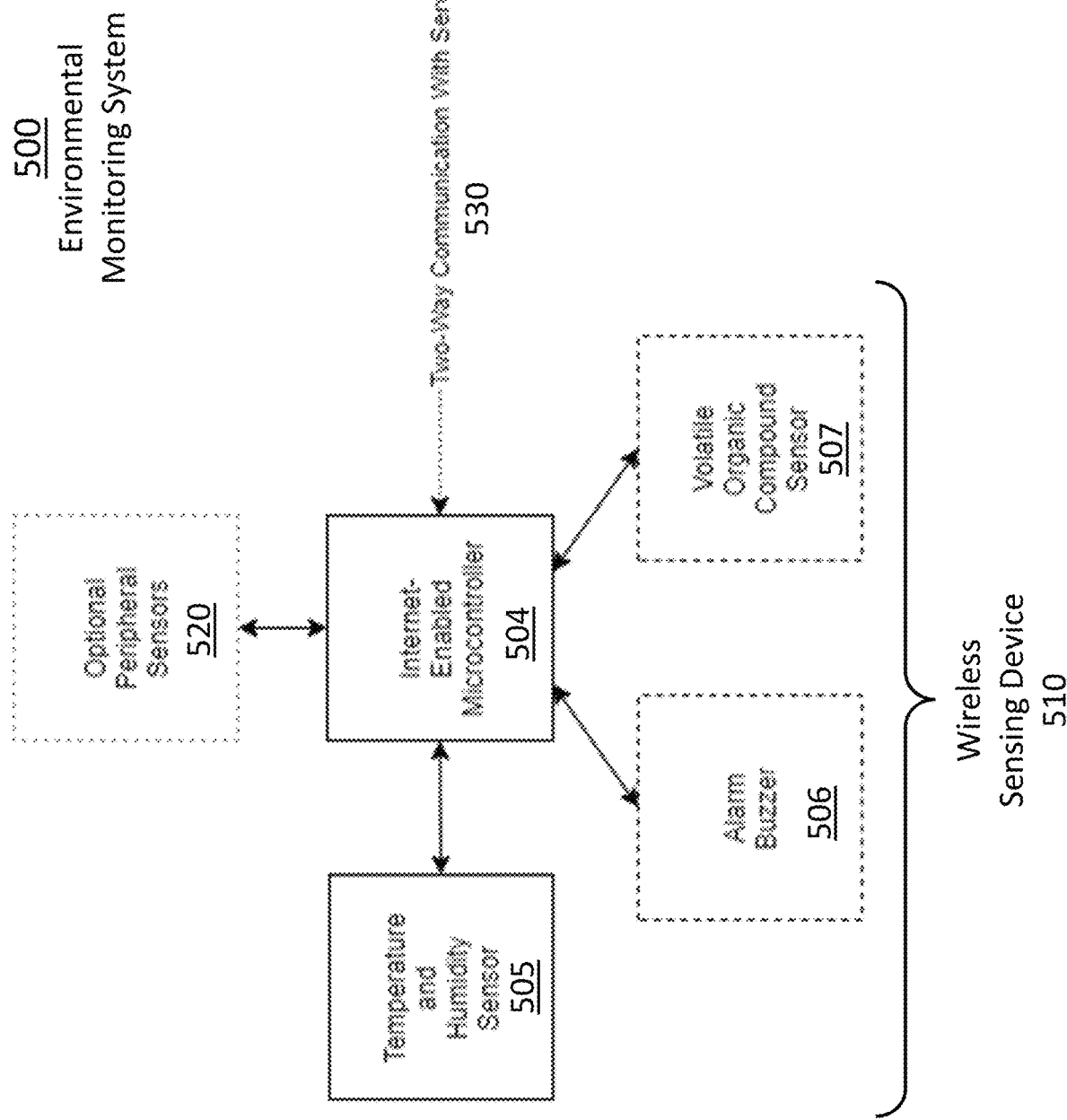
FIG. 5 is a block diagram of an example environmental monitoring system, according to an embodiment.

FIG. 5 is a block diagram of an example environmental monitoring system 500, according to an embodiment. The monitoring system 500 includes a home environment information device (wireless sensing device) 510 similar to those described above, including: a vented plastic box with one open face; a porous, moisture-wicking material affixed to the open face (e.g., bottom) of the plastic box; and various electronic components.

In further detail, the wireless sensing device 510 includes an Internet-enabled microcontroller 504 that is programmed to control various electronic devices, such as a temperature and humidity sensor 505, an alarm buzzer 506, and a volatile organic compound sensor 507. In some embodiments, the wireless sensing device 510 further includes one or more other (peripheral) sensors 520, such as an atmospheric pressure sensor, a motion sensor, a microphone, a gyroscope, a carbon monoxide sensor, and an air quality sensor, to name a few. The microcontroller 504 includes a processor, a memory including non-volatile storage, and a wireless radio for communicating with an external computing device, such as server computer 540.

The server 540 is connected to the Internet and is in communication with the microcontroller 504 through a two-way communication 530 (e.g., Wi-Fi, Bluetooth, or the like). The two-way communication 530, for example, allows the server 540 to send over-the-air updates to the sensing device 510 so that the embedded software on the microcontroller 504 of an existing Wi-Fi connected device will be updated at any time a new software version is released. The server 540 is programmed with algorithms for detecting HVAC and plumbing faults (such as leaks) based on collected environmental data. For instance, a sudden increase in humidity as detected by the temperature and humidity sensor 505 is indicative of a leak being absorbed by the moisture-wicking material and evaporated into the plastic box housing the temperature and humidity sensor 505.

FIG. 6 is a block diagram of an example environmental monitoring system 600, according to another embodiment. The monitoring system 600 includes a physical device (wireless sensing device) 610 and an online server (or other computing device) 640. The server 640 is programmed to run various database management tools (e.g., to store environmental sensor data from the physical device 610) and insight algorithms (e.g., to convert the sensor data into environmental issues or alerts, such as water leak detection, interior freeze potential, and mold growth conditions). The sensing device 610 (and more specifically, the microcontroller 604) is programmed or otherwise configured to send environmental data (e.g., temperature and humidity levels obtained from a temperature and humidity sensor 605) through a wireless transmitter 614 to the server 640 via a wireless receiver 644. The server 640, in turn, is programmed to store the environmental data in the database 650 (which is implemented on a non-volatile storage drive).

The server 640 is further configured to execute insight algorithms 650, which are programmed to translate the environmental data into meaningful alerts for maintenance issues (such as leaks). For example, a water leak detection algorithm can be implemented following the technique discussed in Lee et al., "New leak detection technique using ceramic humidity sensor for water reactors," Nuclear Engineering and Design 205 (2001), pp. 23-33. In addition, an interior freeze potential algorithm can be implemented as follows: when the sensed temperature is 50° F. or higher, there is a low risk of freezing, otherwise when the sensed temperature is 40° F. or higher, there is a medium risk of freezing, otherwise there is a high risk of freezing. Further, a mold growth conditions algorithm can be implemented following the techniques discussed in Carl-Eric Hagentoft and Angela Sasic Kalagasidis, "Controlled Ventilation of Cold Attics Moisture Safety Aspects," pp. 1-11.

The computing device 640 is further programmed to implement a dashboard as part of a customer front-end 660 (e.g., display device, keyboard, graphical user interface (GUI)). The server 640 is further programmed to manage the dashboard to allow users to track different issues that one (or more) of the devices detect. For example, in some embodiments, the monitoring system 600 is programmed to track several wireless sensing devices 610 at different respective locations, such as different rental property units in the same apartment building. Here, the computing device 640 is programmed to display multiple corresponding maintenance issues detected from the sensing devices 610 as part of the customer front-end 660.

In an example embodiment, a wireless sensing device includes a vented plastic enclosure, wicking material, and a printed circuit board (PCB). The wicking material is capable of absorbing water and drawing a puddle under the device. The adhesive responsible for affixing the wicking material to the plastic enclosure is designed to not impede the flow of liquids from outside to under the device. As water is absorbed by the wicking material, it evaporates into the enclosure, thus rapidly increasing the relative humidity inside of the device. This rapid increase in humidity within the device is measured by a humidity sensor that is part of the electronic system on the PCB. The plastic enclosure includes venting holes for increasing the thermal conductivity between the inside and outside of the enclosure while still protecting the electronic components. This provides for accurate sensor measurements within the device of the environment just outside the device.

The sensing device allows the detection of small leaks on unlevel and angled surfaces. While some leak detection devices use two metal leads, where both leads have to touch the water and have a continuous water path between the leads in order to detect a water leak, when only one lead touches the water, the leak is not detected. In addition, if both leads touch the water, but there is a dry space between the leads, the leak is not detected. This can create unreliability for such leak detection devices in basements or on unlevel surfaces. By contrast, the wicking material in the present embodiment allows the sensing device to detect leaks anywhere that water touches the wicking material.

Continuing, the sensing device uses a temperature and humidity sensor to detect mold growth conditions and freezing risks. Here, the sensing device detects the freezing risks and mold growth conditions using the same humidity sensor for liquid water detection. This reduces costs when compared to comparable designs using two metal leads for leak detection.

An example electronics system of a wireless sensing device includes a Wi-Fi-enabled microcontroller, power management, electronics, battery terminals, an alarm buzzer, and a power barrel port, all packaged on a PCB. In the embodiment, the PCB is designed to use two sources of power: two AA batteries or a 3.3V, >0.5 A, 2.5×5.5 mm barrel-ported AC adapter. The PCB logs temperature and humidity data at a periodicity of 5 minutes. It sends a packet of data to the server including box serial number, box time, firmware version, Wi-Fi signal strength, humidity for the previous 30 minutes at 5-minute intervals, temperature for the previous 30 minutes at 5-minute intervals, and battery voltage for the previous 5-minute intervals. In the embodiment, the temperature and humidity sensor is a standard SHT-40, which is commonly used in consumer-grade smart home technology.

In further detail, in order to connect the sensing device to a wireless router, the device opens up a local wireless hotspot that users can connect to using any Wi-Fi-enabled device. When a user connects to the sensing device, a captive page is opened that allows them to enter their wireless router credentials. The setup process gives feedback to the user and verifies that a server connection has been made. After the server connection is made, the sensing device connects to the Internet via the server. In an example environmental monitoring system using a wireless sensing device as described above, a server computer is programmed to wirelessly communicate with the sensing device. In addition, the server computer is programmed to output data to a user of the monitoring system through a display device presenting a user dashboard. The dashboard allows users to check the status of one or more sensing devices wirelessly connected to the server computer.

Figure 7A:
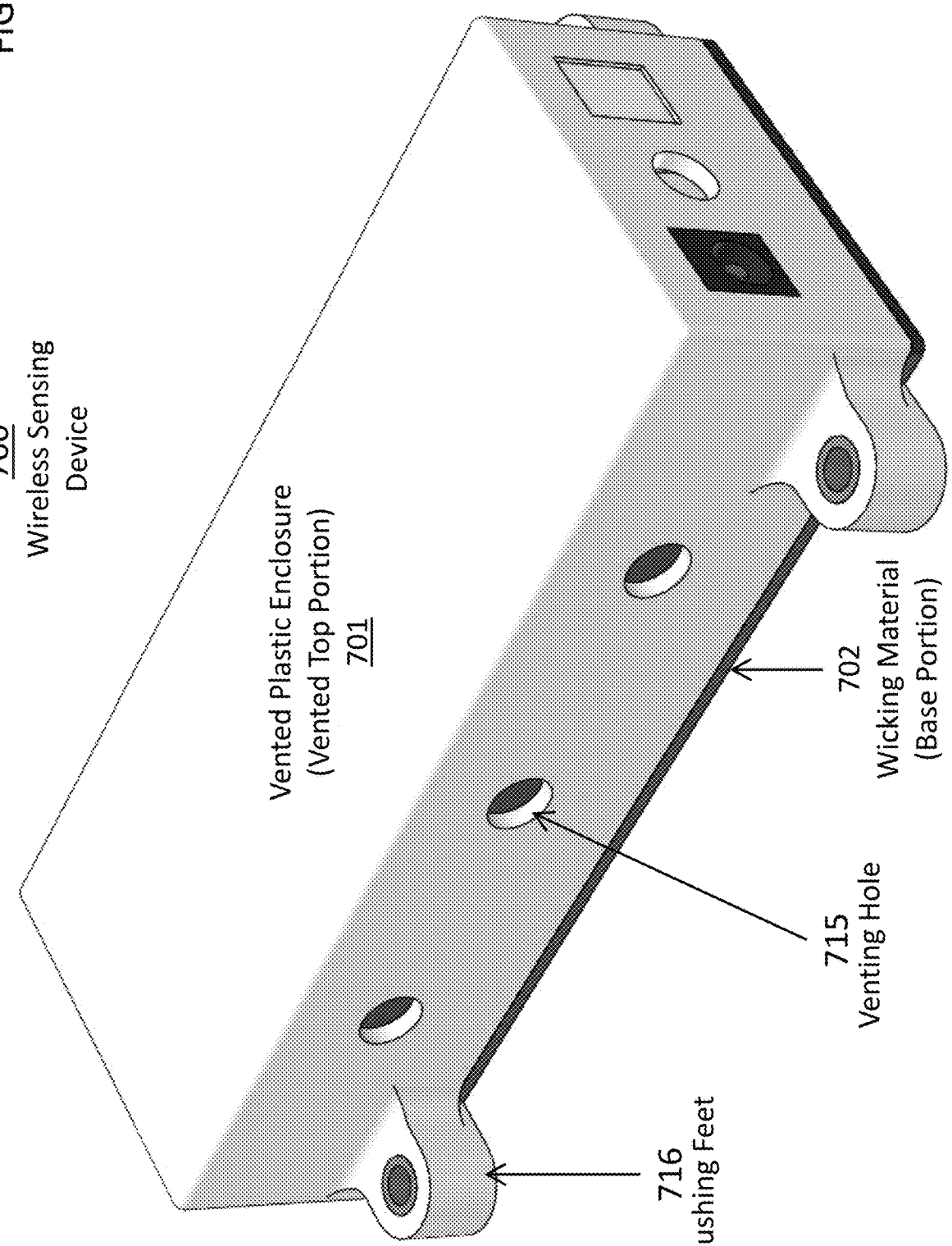
FIGS. 7A and 7B are isometric top and bottom views, respectively, of an example wireless sensing device for environmental monitoring of a location, according to another embodiment.
Figure 7B:
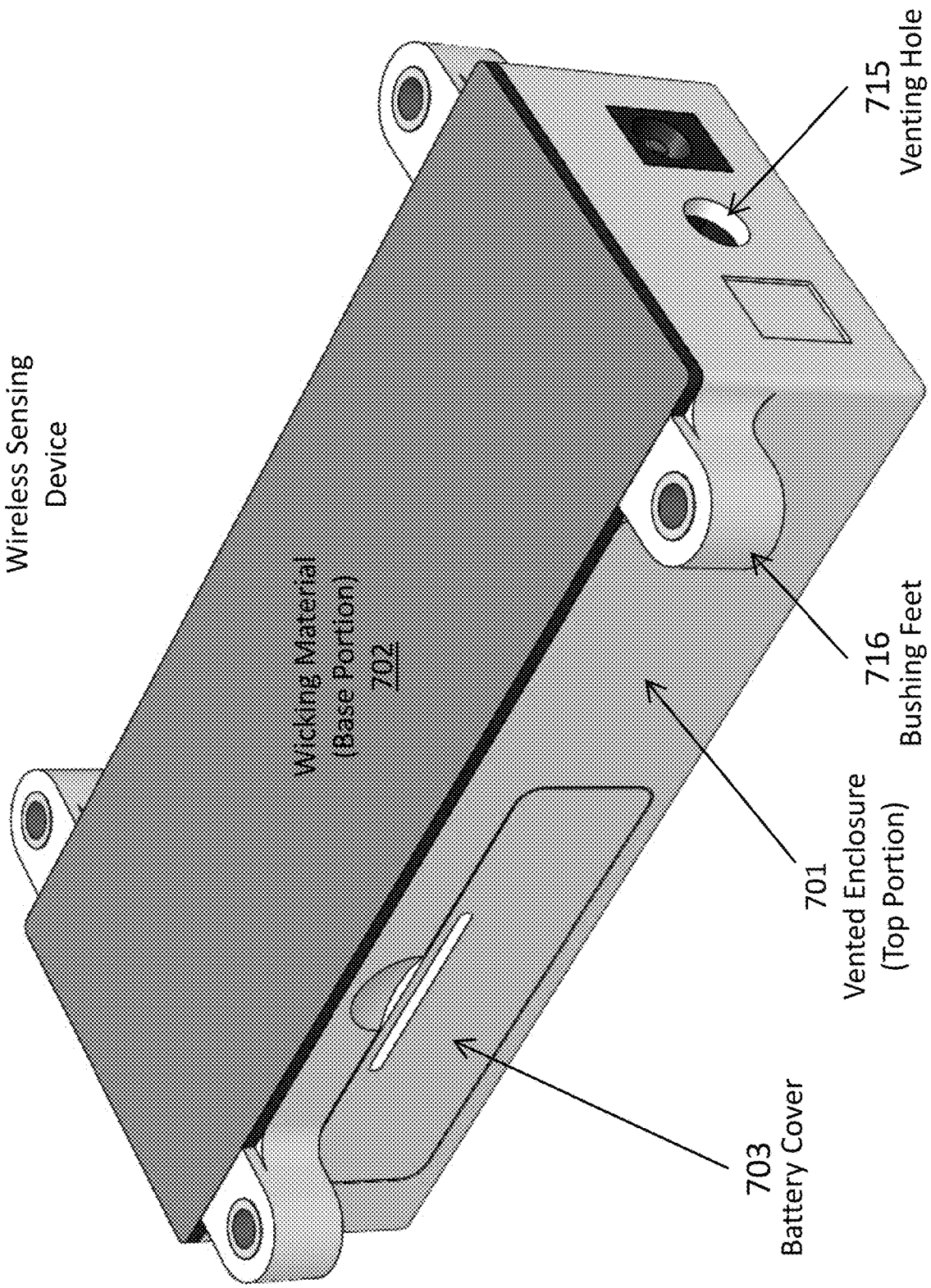

FIGS. 7A and 7B are isometric top and bottom views, respectively, of an example wireless sensing device 700 for environmental monitoring of a location, according to another embodiment. The wireless sensing device 700 includes a vented top portion (top enclosure) 701, a wicking base portion 702 (made of moisture-wicking material), a battery cover 703, and several venting holes 715 in the top portion 701. It should be noted that the wicking material base portion 702 does not extend past the sides of the top portion 701.

In addition, the wireless sensing device 700 includes four bushing feet 716 at corners of the top enclosure 701. These bushing feet 716 include sleeves (or bushings) for receiving attachment devices, such as screws, nails, or staples, for attaching the sensing device 700 to, for example, the floor (e.g., wood floor), cabinetry, cement foundations, or drywall, and helps discourage theft or relocation. The feet 716 also ensure the sensing device 700 can be secured in a proper orientation to detect water on a surface. Other devices (without such feet) when kept in places such as under a sink or in a basement are more easily knocked out of their proper rotation when shuffling things around (e.g., under the cabinet, or in the basement). In some embodiments, the bushings are metal and prevent the plastic feet from cracking should the screw be over tightened. This allows sensing devices 700 to be quickly secured using a power tool without concern for over tightening.

In some embodiments, the bushing feet are flush with the top enclosure (i.e., top of the wicking material). In some other embodiments, as shown in FIG. 7B, the bushing feet 716 extend below the top enclosure 701 and are flush with the bottom of the wicking material 702, which allows the sensing device 700 to be attached with screws to a lower surface and without compressing the wicking material 702.

FIG. 8 is a flow diagram of an example automated method 800 for environmental monitoring of a location (such as a basement, or under a sink) using a wireless sensing device (such as wireless sensing device 100, 510, or 610) at the location, according to an embodiment. The method 800 can be performed by a combination of a sensing device processing circuit (such as a microprocessor or custom logic circuit, e.g., microcontroller 4, 504, or 604) and an external computing device (such as a laptop or server computer, e.g., server 540 or computing device 640) programmed or otherwise configured to perform the steps (such as environmental monitoring system 500 or 600).

Processing begins with the step of sensing 810, using a temperature and humidity sensor (such as temperature and humidity sensor 5, 505, or 605) of the wireless sensing device, a current temperature and humidity of the location. Processing continues with the step of converting 810, using the temperature and humidity sensor, the sensed temperature and humidity to temperature and humidity signals. The method 800 further includes the step of periodically (such as every half hour or 15 minutes) wirelessly transmitting 820, using a wireless transmitter (such as wireless transmitter 614) of the wireless sensing device, the temperature and humidity signals from the location to a computing device (such as server 540 or computing device 640). The method 800 continues with the step of periodically wirelessly receiving 830, using a wireless receiver (such as wireless receiver 644) of the computing device, the transmitted temperature and humidity signals from the wireless sensing device.

The method 800 then includes the step of storing 840, in a non-transitory storage device (such as a disk drive or flash drive, as in database 650) of the computing device, the received temperature and humidity signals. The method 800 further includes the step of executing 850, using the computing device (such as server 540 or computing device 640), insight algorithms (such as insight algorithms 650) on the stored temperature and humidity signals. Finally, the method 800 includes the step of alerting 860, on a display device (such as customer front-end 660) of the computing device, a maintenance issue (such as a leak) in response to the executed insight algorithms. The wireless sensing device includes a housing (such as vented enclosure 1) for securing and protecting the temperature and humidity sensor and the wireless transmitter in a cavity therein. The housing includes a vented top portion defining the cavity and a wicking base portion (such as wicking material 2) including wicking material attached to and covering an exposed underside of the top portion.

In an embodiment, the insight algorithms include leak detection, interior freezing potential, and mold growth conditions. In an embodiment, the method 800 further includes the steps of: absorbing, using the wicking material, water from under the housing; evaporating, using the wicking material, the absorbed water into the cavity through the exposed underside of the top portion; and detecting, using the insight algorithms on the computing system, a leak at the location in response to a sudden increase in the sensed humidity from the evaporation. In an embodiment, the wireless sensing device includes a plurality of wireless sensing devices for monitoring a respective plurality of different locations (such as different units in an apartment building), and the method further includes repeating each of the steps on each wireless sensing device and corresponding received temperature and humidity signals from the wireless sensing device. In an embodiment, the method 800 further includes the step of displaying, on the display device, a dashboard that allows users to track different issues that the wireless sensing devices detect.

The different logic components (e.g., microcontroller, computing device) described throughout can be implemented in a variety of ways, including hardware (e.g., custom logic circuits), firmware (such as with customizable logic circuits), or software (e.g., computer instructions executable on a processing circuit such as an electronic processor or microprocessor). These components can include computing, control, or other logic circuits configured (e.g., programmed) to carry out their assigned tasks. In some example embodiments, their logic is implemented as computer code configured to be executed on a computing circuit (such as a microprocessor) to perform the steps that are part of the technique.

The automated methods described herein can be implemented by an electronic circuit configured (e.g., by code, such as programmed, by custom logic, as in configurable logic gates, or the like) to carry out the steps of the method. Some or all of the methods described herein can be performed using the components and techniques illustrated in FIGS. 1-8. In addition, these methods disclosed herein can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A wireless sensing device for environmental monitoring of a location, comprising:
  an electronic system; and
  a housing for securing and protecting the electronic system in a cavity therein, the housing comprising a vented top portion defining the cavity, and a wicking base portion comprising wicking material attached to and covering an exposed underside of the top portion, the wicking material being configured to absorb water from under the housing;
  wherein the electronic system comprises:
    a temperature and humidity sensor for sensing a current temperature and humidity of the location and converting the sensed temperature and humidity to temperature and humidity signals;
    a wireless transmitter for periodically wirelessly transmitting the temperature and humidity signals from the location to an external computing device;

an alerting device for providing an audible, visual, or tactile signal from the location in order to alert a user of a condition of interest; and a microcontroller for controlling the temperature and humidity sensor, the wireless transmitter, and the alerting device.

2. The wireless sensing device of claim 1, wherein the top portion comprises venting holes to increase thermal conductivity between the cavity and outside of the housing while allowing the housing to still protect the electronic system.

3. The wireless sensing device of claim 1, wherein the wicking material is configured to evaporate the absorbed water into the cavity through the exposed underside of the top portion.

4. The wireless sensing device of claim 1, wherein the electronic system further comprises a printed circuit board (PCB) for securing and interconnecting the temperature and humidity sensor, the wireless transmitter, the alerting device, and the microcontroller.

5. The wireless sensing device of claim 1, wherein the housing comprises a plurality of feet for receiving anchoring devices to anchor the housing to the location.

6. The wireless sensing device of claim 1, further comprising a volatile organic compound sensor, wherein the condition of interest is a flammable gas leak, and the microcontroller is configured to control the volatile organic compound sensor and to activate the alerting device in response to the volatile organic compound sensor detecting the flammable gas.

7. The wireless sensing device of claim 1, further comprising porous adhesive attaching the wicking material to the underside of the top portion and configured to allow water below the top portion to reach and be absorbed by the wicking material.

8. The wireless sensing device of claim 1, wherein the top portion defines a storage area for securing and protecting one or more batteries for powering the electronic system.

9. The wireless sensing device of claim 8, further comprising a voltage sensor for sensing a current voltage of the batteries and converting the sensed voltage to a voltage signal, wherein the wireless transmitter is further for periodically wirelessly transmitting the voltage signal from the location to the external computing device.

10. The wireless sensing device of claim 1, wherein the wireless transmitter comprises a Wi-Fi router for establishing and communicating through a Wi-Fi connection with the external computing device.

11. An environmental monitoring system for use with a computing device having a wireless receiver, a non-transitory storage device, and a display device, the monitoring system comprising:

a wireless sensing device for environmental monitoring of a location and comprising:
an electronic system; and
a housing for securing and protecting the electronic system in a cavity therein, the housing comprising a vented top portion defining the cavity and a wicking base portion comprising wicking material attached to and covering an exposed underside of the top portion, the attached wicking material being configured to absorb water from under the housing and evaporate the absorbed water into the cavity through the exposed underside of the top portion,
wherein the electronic system comprises:
a temperature and humidity sensor for sensing a current temperature and humidity of the location and converting the sensed temperature and humidity to temperature and humidity signals; and
a wireless transmitter for periodically wirelessly transmitting the temperature and humidity signals from the location to the computing device; and
a non-transitory computer readable medium (CRM) having computer instructions stored therein that, when executed by the computing device, cause the computing device to carry out an environmental monitoring process comprising:
periodically wirelessly receiving the transmitted temperature and humidity signals from the wireless sensing device using the wireless receiver;
storing the received temperature and humidity signals in the non-transitory storage device;
executing insight algorithms on the stored temperature and humidity signals, the insight algorithms being configured to detect a leak at the location in response to a sudden increase in the sensed humidity from the evaporation; and
alerting a maintenance issue on the display device in response to the executed insight algorithms.

12. The monitoring system of claim 11, wherein the insight algorithms comprise leak detection, interior freezing potential, and mold growth conditions.

13. The monitoring system of claim 11, wherein the wireless sensing device comprises a plurality of wireless sensing devices for monitoring a respective plurality of different locations, and the monitoring process further comprises repeating each of the steps on corresponding received temperature and humidity signals from each wireless sensing device.

14. The monitoring system of claim 13, wherein the monitoring process further comprises displaying a dashboard on the display device that allows users to track different issues that the wireless sensing devices detect.

15. An automated method of environmental monitoring of a location using a wireless sensing device at the location, the method comprising:

sensing, using a temperature and humidity sensor of the wireless sensing device, a current temperature and humidity of the location;

converting, using the temperature and humidity sensor, the sensed temperature and humidity to temperature and humidity signals;

periodically wirelessly transmitting, using a wireless transmitter of the wireless sensing device, the temperature and humidity signals from the location to a computing device;

periodically wirelessly receiving, using a wireless receiver of the computing device, the transmitted temperature and humidity signals from the wireless sensing device;

storing, in a non-transitory storage device of the computing device, the received temperature and humidity signals;

executing, using the computing device, insight algorithms on the stored temperature and humidity signals; and alerting, on a display device of the computing device, a maintenance issue in response to the executed insight algorithms, wherein the wireless sensing device comprises a housing for securing and protecting the temperature and humidity sensor and the wireless transmitter in a cavity therein, the housing comprising a vented top portion defining the cavity, and a wicking base portion comprising wicking material attached to and covering an exposed underside of the top portion, the method further comprising absorbing, using the attached wicking material, water from under the housing.

16. The method of claim 15, wherein the insight algorithms comprise leak detection, interior freezing potential, and mold growth conditions.

17. The method of claim 15, further comprising:
evaporating, using the wicking material, the absorbed water into the cavity through the exposed underside of the top portion; and
detecting, using the insight algorithms on the computing system, a leak at the location in response to a sudden increase in the sensed humidity from the evaporation, the method further comprising absorbing, using the attached wicking material, water from under the housing.

18. The method of claim 15, wherein the wireless sensing device comprises a plurality of wireless sensing devices for monitoring a respective plurality of different locations, and the method further comprises repeating each of the steps on each wireless sensing device and corresponding received temperature and humidity signals from the wireless sensing device.

19. The method of claim 18, further comprising displaying, on the display device, a dashboard that allows users to track different issues that the wireless sensing devices detect.

\* \* \* \* \*